United States Patent [19]

Van Deursen et al.

[11] Patent Number: 5,066,778

[45] Date of Patent: Nov. 19, 1991

[54] CARBON MONOXIDE/CYCLOPENTEN COPOLYMER AND PREPARATION WITH AROMATIC DINITRO COMPOUND

[75] Inventors: Josephus H. Van Deursen; Johannes A. Van Doorn; Eit Drent, all of Amsterdam, Netherlands; Pui K. Wong, Katy, Tex.

[73] Assignee: Shell Oil Company, Houston, Tex.

[21] Appl. No.: 472,146

[22] Filed: Jan. 30, 1990

[30] Foreign Application Priority Data

Mar. 2, 1989 [NL] Netherlands .................. 8900513

[51] Int. Cl.$^5$ ............................................. C08G 67/02
[52] U.S. Cl. ................................................. 528/392
[58] Field of Search ........................................ 528/392

[56] References Cited

U.S. PATENT DOCUMENTS

| | | | |
|---|---|---|---|
| 3,694,412 | 9/1972 | Nozaki | 260/63 CQ |
| 4,786,714 | 11/1988 | Drent | 528/392 |
| 4,788,279 | 11/1988 | Drent | 538/392 |
| 4,806,630 | 2/1989 | Drent et al. | 528/392 |

FOREIGN PATENT DOCUMENTS

| | | |
|---|---|---|
| 121965 | 10/1984 | European Pat. Off. . |
| 213671 | 3/1987 | European Pat. Off. . |
| 229408 | 7/1987 | European Pat. Off. . |
| 315279 | 5/1989 | European Pat. Off. . |

OTHER PUBLICATIONS

Condensed Chemical Dictionary, Eighth Edition, 1971, p. 233.

Primary Examiner—Harold D. Anderson

[57] ABSTRACT

When a linear alternating polymer of carbon monoxide and a cyclopentene compound is produced in the presence of a catalyst composition comprising a compound of palladium, and anion of a non-hydrohalogenic acid having a pKa below 2 and a bidentate ligand, an improved process results when an aromatic meta-dinitro compound is provided to the catalyst composition mixture.

10 Claims, No Drawings

5,066,778

CARBON MONOXIDE/CYCLOPENTEN COPOLYMER AND PREPARATION WITH AROMATIC DINITRO COMPOUND

FIELD OF THE INVENTION

This invention relates to a process for the production of copolymers of carbon monoxide and a cyclic olefin. More particularly, the invention relates to the production of novel linear alternating copolymers of carbon monoxide and a cyclopentene compound.

BACKGROUND OF THE INVENTION

The class of linear alternating polymers of carbon monoxide and at least one olefinically unsaturated compound is well known in the art. An early production of such polymers is shown by Nozaki, U.S. Pat. No. 3,694,412, wherein polymerization took place in the presence of arylphosphine complexes of palladium moieties as catalyst and certain inert solvents. More recent general processes for the production of the linear alternating polymers are illustrated by a number of published European Patent Applications including 121,965, 181,014, 213,671 and 257,663, as well as by U.S. Pat. Nos. 4,786,714 and 4,788,279. The processes generally involve a catalyst composition formed from a compound of palladium, cobalt or nickel, the anion of a strong non-hydrohalogenic acid and a bidentate ligand of phosphorus, arsenic, antimony, sulfur or nitrogen. The scope of the polymerization process is extensive but, without wishing to be limited, a preferred catalyst composition is typically formed from a compound of palladium, the anion of a non-hydrohalogenic acid having a pKa (measured in water at 18° C.) of below 2 and a bidentate ligand, the choice of which may depend upon the particular unsaturated compound(s) being polymerized. For the polymerization of carbon monoxide and at least one ethylenically unsaturated acyclic hydrocarbon, the ligand is frequently a bidentate ligand of phosphorus.

Somewhat more difficulty is encountered when it is desired to form linear alternating polymers of carbon monoxide and at least one ethylenically unsaturated compound when a cycloolefin is to be employed as reactant. In published European Patent Application 213,671 the use of cyclopentene and cyclohexene as the third monomer is disclosed in the production of terpolymers of carbon monoxide, ethylene and a third ethylenically unsaturated hydrocarbon. A similar disclosure is found in published European Patent Application 121,965. Processes that are useful in the production of a cycloolefin-containing terpolymer, however, are not always useful for the production of linear alternating copolymers of carbon monoxide and cyclic olefins. It would be of advantage to provide an improved process for the production of linear alternating copolymers of carbon monoxide and a cycloolefin, specifically a cyclopentene compound.

SUMMARY OF THE INVENTION

The present invention provides an improved process for the production of novel linear alternating copolymer of carbon monoxide and a cyclopentene compound. More particularly, the present invention provides for such a process in the presence of a catalyst composition formed from, inter alia, a dinitro aromatic compound wherein the nitro groups are located on aromatic ring carbon atoms located meta to each other.

DESCRIPTION OF THE INVENTION

The products of the improved process of the invention are linear alternating copolymers of carbon monoxide and a cyclopentene compound. Suitable cyclopentene compounds comprise cyclopentene and ring-alkylated cyclopentene wherein each carbon atom of the carbon-carbon double bond of the cyclopentene structure has a hydrogen substituent. Such cyclopentene compounds have up to 2 alkyl substituents independently of up to 10 carbon atoms, as illustrated by cyclopentene, 3-methylcyclopentene, 4-butylcyclopentene. Preferred as the cyclopentene compound is cyclopentene. The cyclopentene compound is employed in a molar ratio relative to the carbon monoxide to be copolymerized from about 10:1 to about 1:10. Preferred molar ratios of cyclopentene compound to carbon monoxide are from about 5:1 to about 1:5.

The carbon monoxide and cyclopentene compound are contacted under polymerization conditions in a reaction diluent in the presence of a catalyst composition formed from a mixture of a palladium compound, an anion of a non-hydrohalogenic acid having a pKa (measured in water at 18° C.) below 2, a bidentate ligand and an aromatic dinitro compound wherein the nitro groups are located on aromatic ring carbon atoms which are meta or 1,3 relative to each other. The palladium compound is preferably a palladium carboxylate and palladium alkanoates such as palladium acetate, palladium propionate, palladium hexanoate and palladium octanoate are suitable. The use of palladium acetate is particularly preferred.

The anion component of the catalyst composition solution is the anion of an inorganic acid such as sulfuric acid or perchloric acid or is the anion of an organic acid including anions of carboxylic acids such as trichloroacetic acid, trifluoroacetic acid or dichloroacetic acid and anions of sulfonic acids such as methanesulfonic acid, p-toluenesulfonic acid or trichloromethanesulfonic acid. Trifluoroacetic acid and p-toluenesulfonic acid comprise a preferred class of non-hydrohalogenic acids whose anions are useful as precursors of the catalyst composition. The anion is preferably provided as the free acid but alternatively is provided as a metal salt, particularly a non-noble transition metal salt such as copper p-toluenesulfonate. In yet another modification, the palladium and the anion are provided as a single compound, e.g., palladium trifluoroacetate. Independent of the form in which the anion is provided, the anion is present in the catalyst composition mixture in an amount from about 0.5 mol to about 100 mols per mol of palladium, preferably from about 1 mol to about 50 mols per mol of palladium.

The bidentate ligand utilized as a component of the catalyst composition mixture is one of the bidentate ligands conventionally employed in the production of linear alternating polymers of carbon monoxide and at least one acyclic ethylenically unsaturated compound. In one modification, the ligand is a bidentate ligand of phosphorus, arsenic or antimony represented by the formula

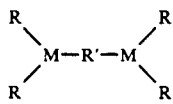

wherein M independently is phosphorus, arsenic or antimony, R independently is aromatic, optionally substituted with a polar substituent, preferably alkoxy, on at least one aromatic ring carbon atom which is ortho to the carbon atom through which the R group is attached to phosphorus. R' is a divalent linking group of 2 to 4 atoms in the phosphorus-phosphorus bridge. Preferred bidentate ligands of this type are ligands of phosphorus and particularly preferred are 1,3-bis(diphenylphosphino)propane and 1,3-bis[di(2-methoxyphenyl)phosphino]propane. In a second modification the bidentate ligand is a ligand of sulfur represented by the formula

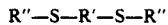

wherein R" is aliphatic or aromatic, optionally substituted with polar substituents, and R' has the previously stated meaning. A preferred bidentate ligand of sulfur of this type is 1,2-bis(ethylthio)ethane. In yet another modification the bidentate ligand is a bidentate ligand of nitrogen represented by the formula

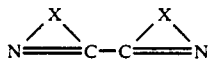

wherein X independently is an organic bridging group having 3 to 4 atoms in the bridge at least two of which are carbon atoms. Preferred nitrogen-containing ligands of this type are 2,2'-bipyridine and 1,10-phenanthroline. Regardless of the particular bidentate ligand employed, the ligand is provided to the catalyst composition mixture in a quantity of from about 0.5 mol to about 100 mols per mol of palladium and preferably from about 0.75 mol to about 50 mols per mol of palladium.

Catalyst compositions formed from the above-described metal compounds, anions and ligands are useful in the production of linear alternating polymers of carbon monoxide and many acyclic ethylencially unsaturated compounds. In the process of the invention, however, a fourth component of specified structure is necessary. Although it is known to use a variety of organic oxidants including aromatic nitrocompounds as catalyst composition mixture components, the fourth component of the catalyst composition mixtures of the present invention is an aromatic dinitro compound wherein the nitro substituents are present in a meta relationship relative to each other. Suitable aromatic dinitro compounds have up to 2 aromatic rings and two nitro substituents located on the ring(s) in a meta relationship. The aromatic dinitro compounds are otherwise hydrocarbyl or are substituted hydrocarbyl containing atoms other than carbon and hydrogen which are present in inert aromatic ring substituents. The preferred aromatic dinitro compounds have one aromatic ring and are hydrocarbyl except for the nitro substituents and contain rings which, except for hydrogen and alkyl substituents contain only the nitro substituents. Illustrative aromatic dinitro compounds include 1,3-dinitrobenzene, 2,4-dinitrotoluene, 2,6-dinitrotoluene and 1,3-dinitronaphthalene. The use of 2,4-dinitrotoluene as the aromatic dinitro compound is preferred.

The carbon monoxide and cyclopentene compound are contacted under polymerization conditions in the presence of a catalytic quantity of the catalyst composition formed from the above components and in the presence of a reaction diluent. The reaction diluent is preferably an alkanol, especially methanol, although alkanones such as acetone and ethers such as tetrahydrofuran are also satisfactory. The catalyst composition should be present in a quantity sufficient to provide from about $1 \times 10^{-6}$ mol to about $1 \times 10^{-4}$ mol of palladium per mol of cyclopentene. Typical polymerization conditions include a reaction temperature of from about 20° C. to about 120° C. although reaction temperatures from about 30° C. to about 100° C. are preferred. The reaction pressure is suitably from about 5 bar to about 150 bar but pressures from about 20 bar to about 100 bar are more frequently employed.

The contacting of the carbon monoxide and cyclopentene compound and the catalyst composition takes place in a suitable reactor and contact is maintained by conventional procedures such as shaking or stirring. Subsequent to polymerization the reaction is terminated as by cooling the reaction mixture and releasing the pressure. The linear alternating polymer is recovered by well known procedures such as filtration or decantation when the polymer is substantially insoluble in the product mixture or procedures such as precipitation with non-solvent or extraction when the polymer product is soluble in the product mixture. The polymer is used as recovered or is purified as by contacting with a solvent or extraction agent selective for catalyst residues.

The polymeric products are linear alternating copolymers of carbon monoxide and the cyclopentene compound and the copolymers are thermoplastics of relatively high melting points. The polymers are processed by methods conventional for thermoplastics such as extrusion, injection molding and thermoforming into a variety of formed or shaped articles of established utility, e.g., films and sheets which are useful in packaging applications and containers for food and drink.

The invention is further illustrated by the following Comparative Experiments (not of the invention) and Illustrative Embodiments which should not be construed as limiting. The polymer product of each Illustrative Embodiment was shown by $^{13}$C-NMR to be of a linear alternating structure.

ILLUSTRATIVE EMBODIMENT I

A copolymer of carbon monoxide and cyclopentene was produced by charging to a 250 ml autoclave equipped with a mechanical stirrer 30 ml of cyclopentene and 30 ml of methanol. A catalyst composition solution was then added which comprised 0.1 mmol palladium acetate, 0.1 mol p-toluenesulfonic acid, 3.0 mmol 2,2'-bipyridine and 27.5 mmol 2,4-dinitrotoluene. Any air present in the autoclave was removed by evacuation and carbon monoxide was added to give a pressure of 40 bar. The contents of the autoclave were then heated to 70° C. and maintained at that temperature for 5 hours. Polymerization was then terminated by cooling the reactor and contents to room temperature and releasing the pressure. The resulting mixture was added, with stirring, to methanol and the copolymer was recovered by filtration, washed with methanol and dried at 50° C. The yield of copolymer was 15 g, produced at a rate of 300 g of copolymer/g Pd hr.

ILLUSTRATIVE EMBODIMENT II

Carbon monoxide/cyclopentene copolymer was produced by a procedure substantially similar to that of Illustrative Embodiment I except that 1,2-bis(ethylthio)ethane was used in the catalyst composition solution instead of the bipyridine. The yield of copolymer was 9.5 g, produced at a rate of 190 g of copolymer/g Pd. hr.

ILLUSTRATIVE EMBODIMENT III

A copolymer of carbon monoxide and cyclopentene was produced by a procedure substantially similar to that of Illustrative Embodiment I except that 0.15 mmol of 1,3-bis(diphenylphosphino)propane was employed in the catalyst composition solution instead of 0.3 mmol of the bipyridine, and the reaction temperature was 80° C. instead of 70° C. The yield of copolymer was 5 g produced at a rate of 100 g of copolymer/g Pd hr.

ILLUSTRATIVE EMBODIMENT IV

A carbon monoxide/cyclopentene copolymer was prepared by a procedure substantially similar to that of Illustrative Embodiment I except that the catalyst composition solution contained 30 mmol of 1,3-dinitrobenzene instead of 27.5 mmol 2,4-dinitrotoluene and the reaction temperature was 80° C. instead of 70° C. The yield of copolymer was 14 g, produced at a rate of 280 g of copolymer/g Pd hr.

ILLUSTRATIVE EMBODIMENT V

A carbon monoxide/cyclopentene copolymer was produced by a procedure substantially similar to that of Illustrative Embodiment I except that the catalyst composition solution contained 30 mmol 2,6-dinitrotoluene instead of 27.5 mmol 2,4-dinitrotoluene and the reaction temperature was 80° C. instead of 70° C. The yield of copolymer was 2.5 g, produced at a rate of 50 g of copolymer/g Pd hr.

COMPARATIVE EXPERIMENT I

The procedure of Illustrative Embodiment I was repeated except that 40 mmol of 1,4-benzoquinone was employed in place of the 27.5 mmol of 2,4-dinitrotoluene and the temperature was 80° C. instead of 70° C. No polymer was formed.

COMPARATIVE EXPERIMENT II

The procedure of Illustrative Embodiment I was repeated except that 40 mmol of nitrobenzene was provided to the catalyst composition solution instead of 2,4-dinitrotoluene, and the reaction temperature was 60° C. instead of 70° C. No polymer was formed.

COMPARATIVE EXPERIMENT III

The procedure of Illustrative Embodiment I was repeated except that 40 mmol of p-chloronitrobenzene was provided to the catalyst composition solution instead of 2,4-dinitrotoluene, and the reaction temperature was 60° C. instead of 70° C. No polymer was formed.

COMPARATIVE EXPERIMENT IV

The procedure of Illustrative Embodiment I was repeated except that 30 mmol of 1,2-dinitrobenzene was provided to the catalyst composition instead of 2,4-dinitrotoluene, and the reaction temperature was 80° C. instead of 70° C. No polymer was formed.

COMPARATIVE EXPERIMENT V

The procedure of Illustrative Embodiment I was repeated except that 3.0 mmol of 1,2-bis(ethylthio)propane and 40 mmol of 1,4-benzoquinone were provided to the catalyst composition solution instead of the bipyridine and the 2,4-dinitrobenzene, and the reaction temperature was 60° C. instead of 70° C. No polymer was formed.

COMPARATIVE EXPERIMENT VI

The procedure of Illustrative Embodiment I was repeated except that 0.15 mmol of 1,3-bis(diphenylphosphino)propane and 40 mmol of 1,4-benzoquinone were provided to the catalyst composition solution instead of the bipyridine and the 2,4-dinitrotoluene. No polymer was formed.

What is claimed is:

1. A process for producing a linear alternating copolymer of carbon monoxide and a cyclopentene compound having a hydrogen substituent on each carbon atom of the carbon-carbon double bond, which comprises contacting the carbon monoxide and cyclopentene in a reaction diluent under polymerization conditions, in the presence of a catalyst composition formed from a palladium compound, an anion of a non-hydrohalogenic acid having a pKa below 2, a bidentate ligand, and an aromatic m-dinitro compound.

2. The process of claim 1 wherein the dinitro compound has up to two aromatic rings and is unsubstituted except for hydrogen and alkyl substituents and the two nitro groups.

3. The process of claim 2 wherein the cyclopentene compound has up to 2 alkyl substituents independently of up to 10 carbon atoms.

4. The process of claim 3 wherein the aromatic dinitro compound has one aromatic ring.

5. The process of claim 4 wherein the cyclopentene compound is cyclopentene.

6. The process of claim 5 wherein the aromatic dinitro compound is 2,4-dinitrotoluene.

7. The process of claim 5 wherein the aromatic dinitro compound is 1,3-dinitrobenzene.

8. A linear alternating copolymer from monomers consisting of carbon monoxide and a cyclopentene compound wherein the cyclopentene compound has up to 2 alkyl substituents independently having up to 10 carbon atoms inclusive and a hydrogen substituent on each carbon atom of the carbon-carbon double bond.

9. The copolymer of claim 8 wherein the cyclopentene compound is cyclopentene.

10. A linear alternating copolymer from monomers consisting of carbon monoxide and a cyclopentene compound, wherein the cyclopentene compound has up to 2 alkyl substituents independently having up to 10 carbon atoms inclusive and a hydrogen substituent on each carbon atom of the carbon-carbon double bond, and wherein the copolymer is produced in the presence of a catalyst composition formed from a palladium compound, an anion of a non-hydrohalogenic acid having a pKa below 2, a bidentate ligand, and an aromatic m-dinitro compound.

* * * * *